UNITED STATES PATENT OFFICE.

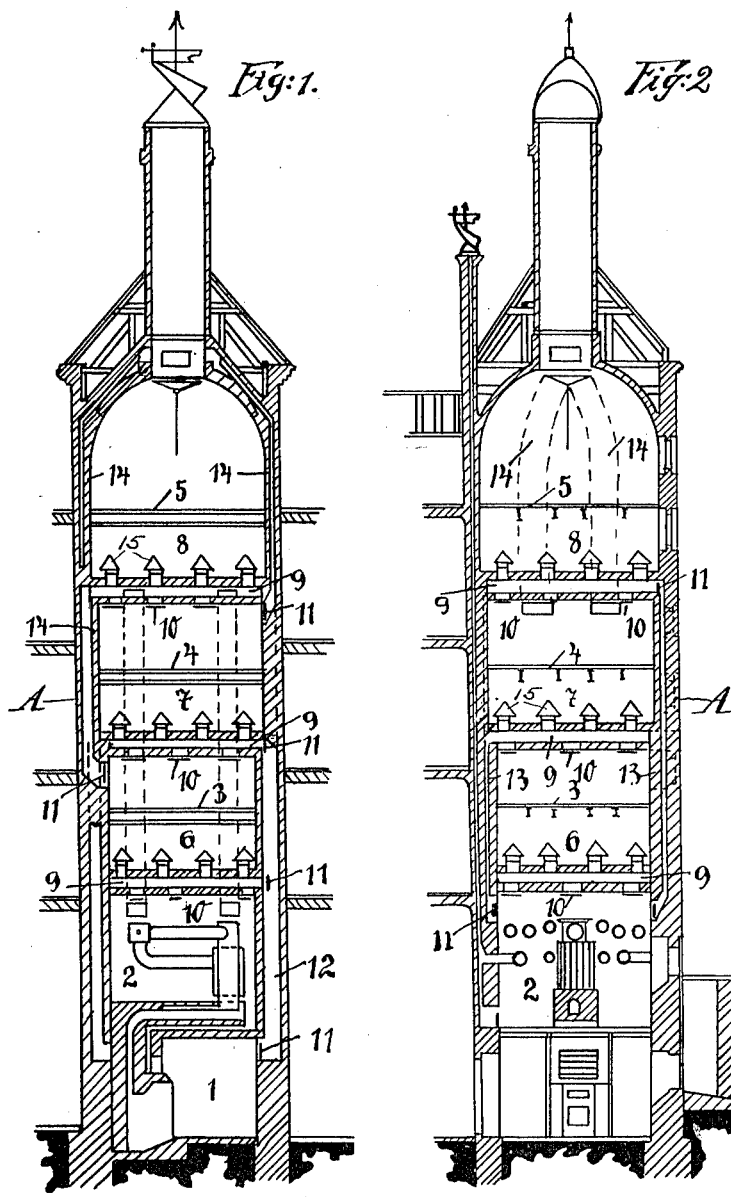

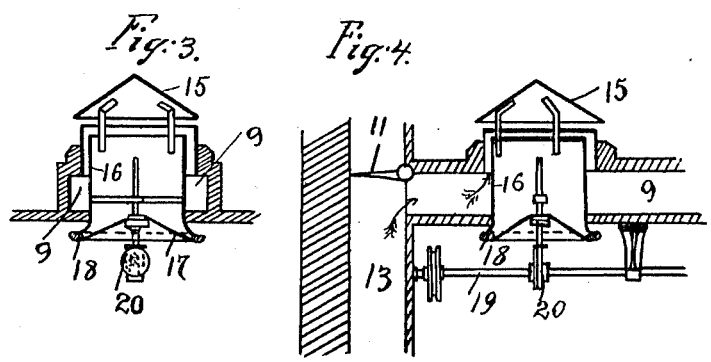
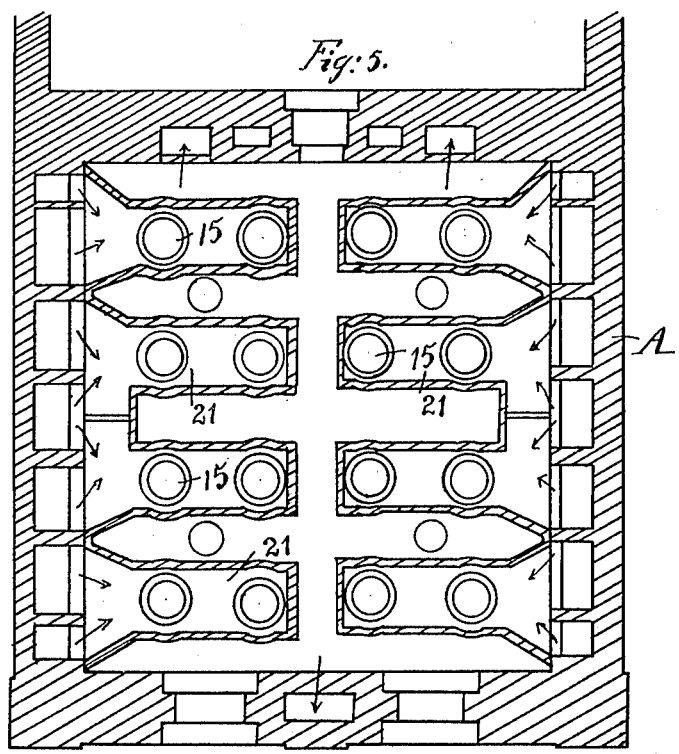

CONRAD BRÜNE, OF RADEBERG, GERMANY.

MULTIFLOOR KILN.

1,001,347.    Specification of Letters Patent.    Patented Aug. 22, 1911.

Application filed March 8, 1911. Serial No. 613,197.

*To all whom it may concern:*

Be it known that I, CONRAD BRÜNE, a subject of the German Emperor, residing at Radeberg, in the Kingdom of Saxony, German Empire, have invented certain new and useful Improvements in Multifloor Kilns, of which the following is a specification.

The present invention relates to multifloor-kilns, and has for its object to provide a three-floor-kiln, the floors of which form drying chambers which have tightly closing chambers or passages for the uniform mixing of hot and cold air, which air mixture may subsequently be led to the spaces between the floors and said mixing chambers, which spaces are provided which is generally known as the "sow."

An essential feature of the invention consists in providing beneath the lower floor, an air-mixing chamber or passage which is so constructed that it separates the lower floor from the heating apparatus in such a manner that the lower floor and consequently the space between the latter and the air-mixing chamber, are protected against radiant heat. By this means, the perfect mixing of cold and hot air has to take place in the air-mixing chamber itself and not directly below the floor as would be otherwise the case. This air-mixing chamber, situated below the lower floor is in connection with the outer-air by means of controllable passages.

In contrast with known kilns, which do not possess an air mixing chamber below the lower floor to protect against radiant heat, this new arrangement possesses manifold advantages:—The different floors can be used independently of each other, and each of them can receive any desired temperature. A three floor kiln can, if desired, be turned into a single floor kiln or double floor kiln. For example one can use only the upper and lower floors or the middle floor and the upper floor and so on. As an instance one of the floors can be used for the curing of malt for beer by the Munich method while simultaneously the other floor can be used to cure malt suitable for manufacturing Pilsen beer without deviating from the principle to pass the malt in the kiln in succession on to all floors beginning from the upper one. Moreover, it is possible to maintain on one floor at desired times and with malt containing a certain quantity of water certain high temperatures required for the cure of malt for Munich beer, and such temperature can be higher than those of the next and lower floor, while the malt coming previously from the middle floor can be cured on the lower floor for beer of the Pilsen kind. If the lower floor is cleared, the malt for beer for the Munich method can be lowered to the lower floor on which also higher temperatures can be maintained which are necessary for the completion of the curing process for malt for beer by the Munich process. This method of proceeding can also be reversed by curing on the lower floor malt for Munich beer and in the upper floor malt for Pilsen beer, without altering the nature and color of the malt and without any interruption in the curing process.

Such modes of proceedings as hereinbefore described are not possible with known kilns for the reason that the lower floor is not separated from the heating apparatus and its radiant heat. By reason of the last mentioned fact the upper floors of cold constructions of kilns were dependent for their heating from the lower floor while in a kiln constructed in accordance with the present invention, a perfect independence of all its floors is attained so that each floor can be worked with different degrees of temperature, a circumstance, which enables the use of new and advantageous processes in the curing of malt.

In the accompanying drawings Figure 1 is a vertical section through a three floor kiln, Fig. 2 is a vertical section taken at right angles to Fig. 1. Figs. 3 and 4 are detail vertical sections of a special construction of the ventilating tubes, and Fig. 5 is a horizontal section through an air-mixing chamber, consisting in the present case of single air-mixing passages.

The kiln consists of a hollow shaft as A containing a cold air chamber 1, a chamber 2 for the heating apparatus, and a plurality of drying chambers formed by a lower floor 3, a middle floor 4 and an upper floor 5. Beneath each floor and separated therefrom, by an intermediate space, called the "sow" 6, 7, and 8 respectively, air mixing chambers 9 are arranged, in which cold and hot air are mixed, and after a thorough mixing said air traverses the intermediate space and the floor situated above. The air-mixing chambers of the upper and middle floors can be tightly closed from the floors below by means of slides or valves 10, represented by lines in Figs. 1 and 2 but shown in a more detailed form in Figs. 3 and 4. In a like manner the lower mixing chamber can be tightly separated from the heating chamber 2 and the separation is such that no radiant heat can pass from the heating apparatus chamber 2 to the lower floor 3, a factor which is of particular importance.

From Figs. 1 and 2 it will be seen that the air-mixing chambers are in communication with the hot-and-cold air channels or passages built in the inclosing walls of the kiln, which passages can be closed at their inlets and outlets by slides or valves 11. Thereby any one or all of the floors can be supplied not only with mixed air but also with either cold air or warm air.

12 designates cold air passages or conduits which lead from the chamber 1 or from the outside air to the air-mixing chambers, and 13 hot air passages or conduits which convey hot air from the heat apparatus chamber 2 to the air-mixing chambers.

14 designates outlet passages from the middle floor to the outlet or chimney. All these passages can be closed by valves or slides 11, so that either hot or cold air can be led to the different air-mixing chambers 9.

Figs. 3 and 4 illustrate one form of means for closing communication between the mixing chambers and the floors beneath them and the lower chamber from the heating chamber 2. Below each hood or cone 15 is a tube 16 a plurality of which pass through each air-mixing chamber 9, and against these tubes tight fitting valve plates 17 can be pressed, which are provided at 18 with asbestos or the like materials. All the plates of each air-mixing chamber are situated in a row and are pressed simultaneously against the bottom of the tubes 16 by eccentrics 20 mounted on a shaft 19 which eccentrics engage stems fixed to the plates. When the eccentrics are in the position shown in Figs. 3 and 4 the closing valves 17 are pressed against the lower edges of the tubes 16. If the eccentrics 20 are turned 180° the closing valves 17 are lowered and air can pass from below upward.

The arrows in Fig. 4 indicate the path of the air from the passages 13 to the mixing chamber 9 in order to be thoroughly mixed with cold air and led subsequently through the "sow" 6, 7, 8, to the floors.

In Fig. 5 it is indicated that the air-mixing chamber is divided in a number of passages 21, in which the arrangements as shown in Figs. 3 and 4 are arranged. Arrows indicate how the air is led to the kiln from the various passages.

I claim:—

1. A kiln comprising a plurality of floors, a mixing chamber located beneath each floor communicating with the space between said chamber and floor above, means to supply hot and cold air to said chambers, and means to connect said chambers with the space between the chamber and the floor below.

2. A kiln comprising a plurality of floors, a mixing chamber located beneath each floor communicating with the space between said chamber and floor above, means to supply hot and cold air to said chambers, and means to connect said space and chambers with the space between the chamber and the floor below.

3. A kiln comprising a heating chamber, a plurality of closed drying chambers, a mixing chamber provided with apertures in its top and bottom, located in each of the drying chambers and communicating therewith through the apertures in the tops of the mixing chambers, conduits connecting the mixing chambers with the heating chambers, conduits to supply cold air to the mixing chamber, and means to connect the latter with the drying chambers through the apertures in the bottoms of the mixing chambers.

4. A kiln comprising a heating chamber, a plurality of closed drying chambers, a mixing chamber provided with apertures in its top and bottom, located in each of the drying chambers and communicating therewith through the apertures in the tops of the mixing chambers, conduits connecting the mixing chambers with the heating chambers, conduits to supply cold air to the mixing chamber, valves in said conduits, and means to connect the mixing chamber with the drying chambers through the apertures in the bottoms of the mixing chambers.

5. A kiln comprising a heating chamber, a plurality of closed drying chambers, a mixing chamber, provided with apertures in its top and bottom, located in each of the drying chambers and communicating therewith through the apertures in the tops of the mixing chambers, conduits connecting the mixing chambers with the heating chamber, conduits to supply cold air to the mixing chambers, valves in said conduits, means to connect the mixing chambers with the drying chambers through the apertures in the bottoms of the mixing chambers, and valves to close said bottom apertures.

6. A kiln comprising a plurality of floors, a mixing chamber located beneath each floor communicating with the space between the chamber and floor, means to supply hot and cold air to said chambers, a heating chamber beneath the lower floor, a mixing chamber interposed between said lower floor and heating chamber and communicating with the space below the lower floor, means to connect the lower mixing chamber with the hot air chamber, and means to supply cold air to said lower mixing chamber.

7. A kiln comprising a plurality of drying chambers, a mixing chamber located in each drying chamber, tubes projecting through the mixing chamber, valve-plates to close the lower ends of said tubes, a shaft mounted beneath the tubes, and eccentrics on the shaft to raise and lower the valves.

In witness whereof I have hereunto set my hand in presence of two witnesses.

CONRAD BRÜNE.

Witnesses:
 WOLDEMAR HAUPT,
 HENRY HASPER.

Copies of this patent may be obtained for five cents each, by addressing the "Commissioner of Patents, Washington, D. C."